No. 767,594. Patented August 16, 1904.

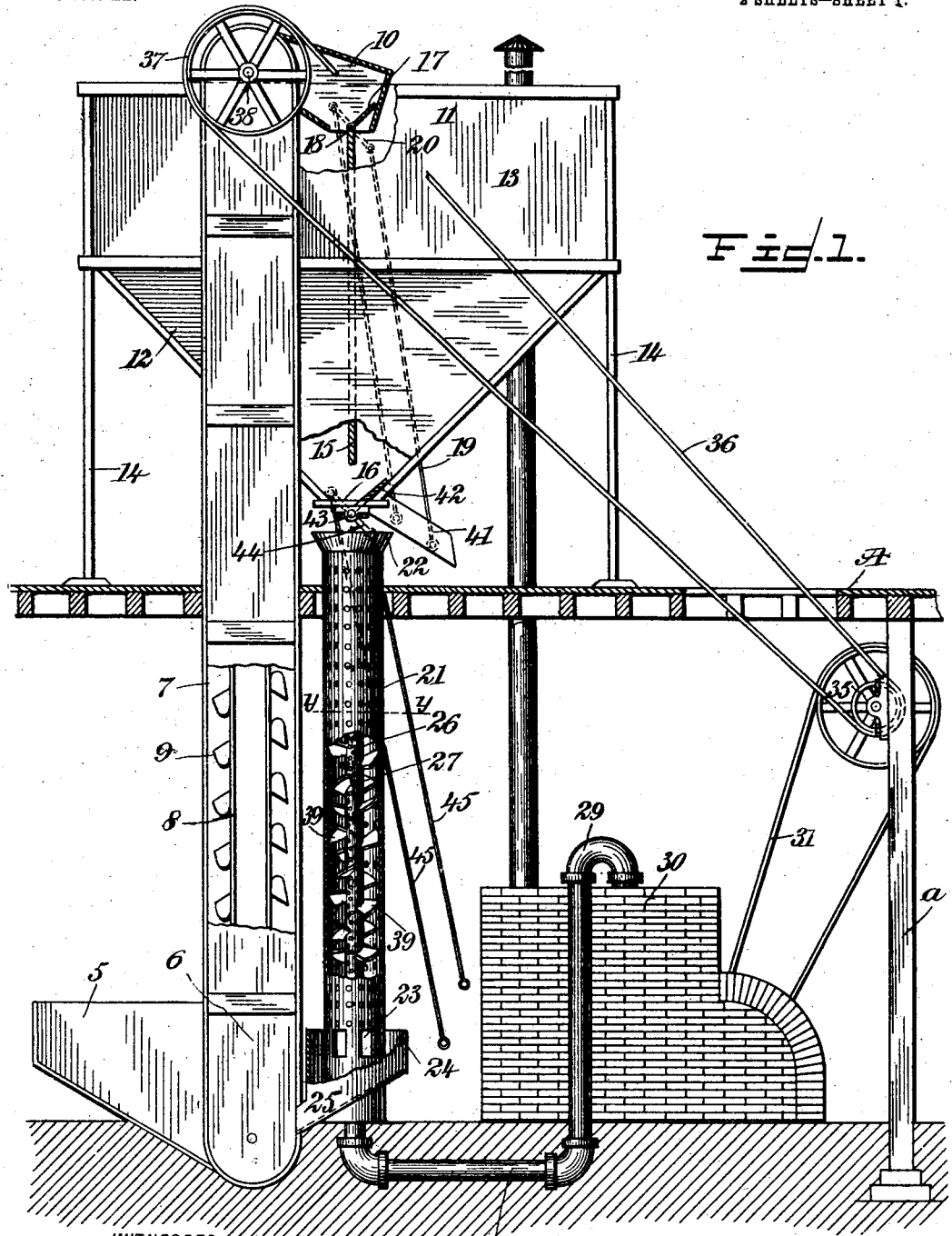

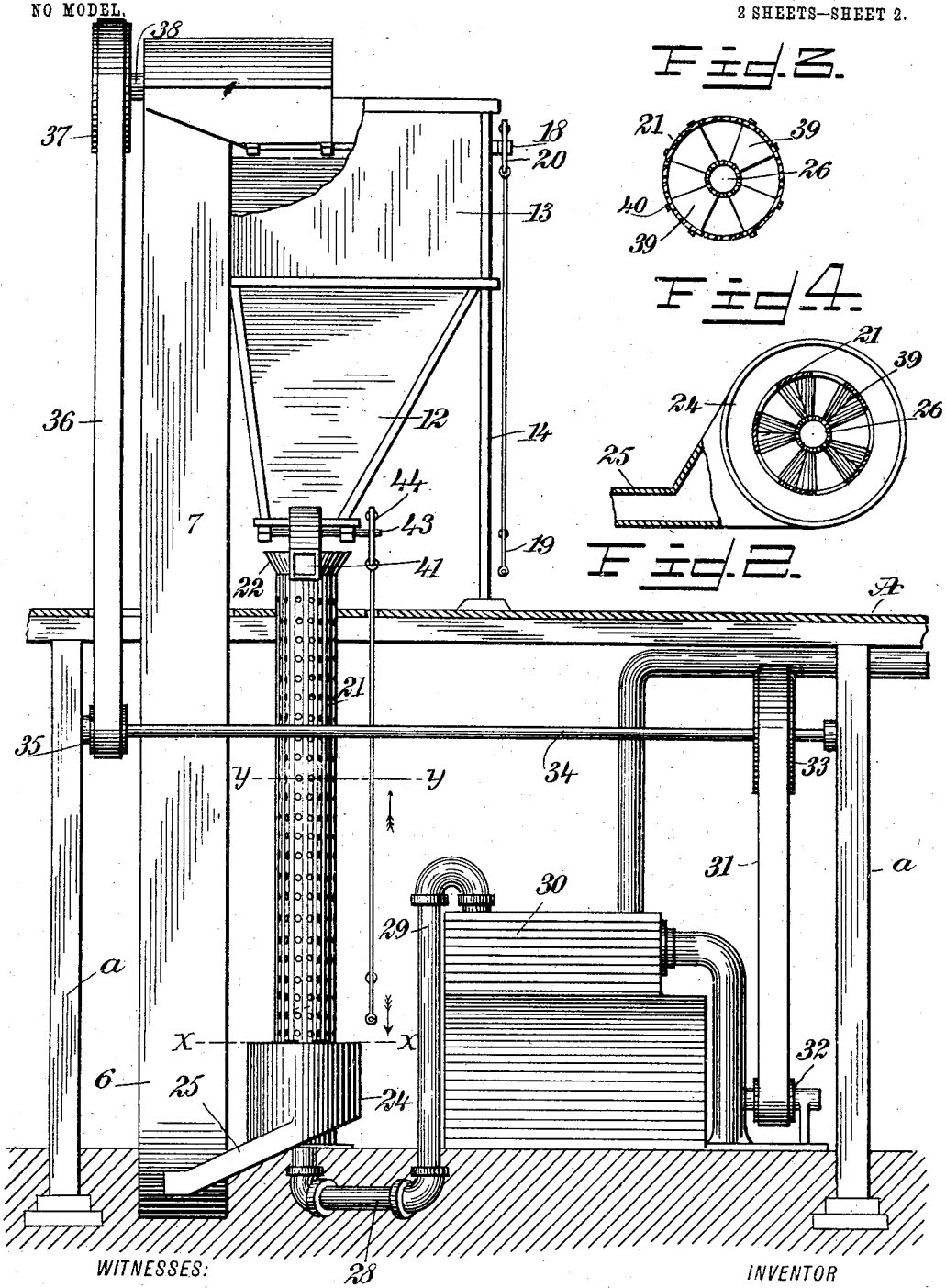

UNITED STATES PATENT OFFICE.

EUGENIO PENAGOS, OF BUCARAMANGA, COLOMBIA.

COFFEE-DRIER.

SPECIFICATION forming part of Letters Patent No. 767,594, dated August 16, 1904.

Application filed December 3, 1903. Serial No. 183,670. (No model.)

*To all whom it may concern:*

Be it known that I, EUGENIO PENAGOS, a subject of the King of Spain, and a resident of Bucaramanga, Colombia, have invented a new and Improved Coffee-Drier, of which the following is a full, clear, and exact description.

My invention relates to improvements in a drying apparatus, and appertains particularly to an apparatus designed for drying coffee-beans and the like.

In this instance I have particularly in view as an object the provision of an apparatus through which the coffee may be passed continuously and subjected to a number of heatings, thus insuring a thorough drying or curing of the beans.

A further object of my invention is to provide certain means for directing the coffee to the heating device and after the drying process has been completed to direct the beans away from the heater to a point of discharge or deposit.

Still another object of my invention is to construct an apparatus which will embody the desired features of simplicity, capacity, convenience, and effectiveness.

With the above-mentioned objects and others of a similar nature in view my invention consists in the construction, combination, and arrangement of parts, as is described in this specification, delineated in the accompanying drawings, and set forth in the annexed claims.

Reference is to be had to the accompanying drawings, forming a part of this specification, in which similar characters of reference indicate corresponding parts in all the figures.

Figure 1 is a view, partly in side elevation and partly in section, of a drying apparatus embodying my invention. Fig. 2 is a front end view of the same. Fig. 3 is a transverse sectional view taken through the coffee-heating conduit on the lines $y$ $y$ of Figs. 1 and 2, and Fig. 4 is a view taken on the line $x$ $x$ of Fig. 2.

By referring to the drawings it will be seen that the apparatus comprises, in combination, a heater, a hopper for primarily receiving the coffee-beans, a conveying device, a receptacle mounted adjacent to the conveying device for taking the coffee therefrom, and a drying apparatus through which the coffee passes from the receptacle. After the coffee has been subjected to a sufficient heating it may be diverted or directed from the receptacle to a point of deposit or discharge.

In the accompanying drawings, A designates a floor or frame designed to support certain parts of the apparatus, said floor being sustained by a number of vertical beams or standards $a$. A quantity of the coffee-beans to be subjected to the drying process is deposited in the hopper-bin 5, which bin may be of any desired form and communicates with the lower end 6 of the long vertical box-like conveyer-trough 7, which trough extends up through the floor A. Within this trough travels an endless bucket conveyer 8, extending around suitable wheels or sprocket-wheels at the upper and lower ends of the trough, the buckets 9 of the conveyer being designed in their path of travel to scoop up a quantity of the beans in the bottom of the trough, to which they have flowed from the hopper, and to carry the beans upward in the trough to the chute 10, communicating with the top of the conveyer-trough, said chute leading into a relatively large bin, receptacle, or box 11. This box, as will be noted by reference to the drawings, has a converging or inclined bottom portion 12 formed beneath the box structure 13 of the receptacle, the latter being supported as an entirety through the medium of standards or posts 14. This receptacle is divided into two compartments through the medium of a vertical partition 15, which extends approximately centrally of the receptacle, the upper end of said partition terminating at the center of the opening of the chute 10, while the lower end thereof lies a short distance above the opening 16 at one end of the inclined bottom portion 12.

Pivoted to the upper end of the partition 15 is a flap-valve 17, mounted upon a rod 18, said valve being designed to direct the coffee-beans from the chute 10 to one compartment or the other of the receptacle, according as the valve is operated through the medium of cords 19, there being two of such cords, one connected to each end of a bar 20, which in turn swings the valve 17 as it is pulled to one side or the other, as clearly shown in Fig. 1, so that the coffee will, as stated, upon its issue from the chute 10 fall into one or the other of the compartments, as directed by the flap-valve 17.

Immediately beneath the opening 16 at the bottom of the receptacle is arranged a relatively large coffee-drying conduit 21, preferably perforated and having a flared mouth portion 22, the lower end of such conduit having a number of openings 23 therein, through which the downwardly-passing coffee may flow into the circular chute 24, and formed integral with said circular chute and inclined downward therefrom, so as to form a pathway leading into the bottom of the conveyer-trough, is a chute 25.

The tubular conduit 21, which receives the coffee from the receptacle 11, has extended centrally therethrough and concentric therewith a heater-pipe 26, provided with a large number of small perforations 27 along its entire length, these perforations being designed to permit the escape from the pipe of heated air, which is supplied to the pipe 26 through the medium of the furnace-pipes 28 29, communicating with the oven or furnace 30, the heated air from the furnace being blown or forced into the pipe by a fan or the like (not shown) driven by an endless belt 31, which travels over pulleys 32 33, mounted, respectively, upon the shaft of the fan and upon the main shaft 34 of the machine, and it is further to be noted that upon this shaft 34 is also affixed a driving-pulley 35, imparting motion to an endless belt 36, which passes over a bandwheel 37, connected to a shaft 38 at the top of the conveyer-chute, and by this arrangement it will be observed that motion is imparted to the endless conveyer 8. As the coffee passes from the receptacle 11 into the tubular conduit it strikes against and is scattered by a large number of segmental plates 39, which plates are secured, through the medium of bolts 40, at various points along the length of the conduit, these plates being arranged in a spiral pathway, as is clearly shown in Fig. 1. After the coffee has passed through the drying-conduit a sufficient number of times it may be directed from the receptacle to the discharge-trough 41, communicating with one side of the inclined bottom 12 of the receptacle 11 through the medium of a flap-valve or gate 42. This gate or valve, as will be seen, is pivoted upon a rod 43, arranged approximately centrally of the opening 16 in the bottom 12, a bar 44 being secured to the rod 43 for operating the same, said bar in turn being actuated through the medium of cords 45, one of which is connected to an eye at each end of the rod 44. From this construction of the gate-valve it will be seen that when it is actuated so as to throw the valve to the left into the position shown in dotted lines the part of the opening directly above the conduit will be closed and the coffee-beans will be directed into the trough 41, from whence they may pass to any point of deposit; but when the valve is operated to pull the same toward the right, as is shown in full lines in said Fig. 1, the discharge trough or chute 41 will be closed and the coffee may pass freely down into the conduit.

From the above description, taken in connection with the accompanying drawings, the construction and operation of my apparatus will be clearly understood. A quantity of the coffee-beans is thrown into the hopper 5 and from there is carried by the endless traveling conveyer up to the deposit-chute 10. As the buckets are inverted in their course of travel the beans pass through said chute and are directed into the receptacle 11, through which they pass into the drying-conduit, the gate-valve of the discharge-trough 41 being presumably closed. As the beans pass down the conduit they are scattered by the spirally-arranged plates and are subjected to a current of hot air issuing through the apertures of the hot-air pipe and at the end of the trough or chute flow through the openings 23 and down the inclined pathway 25 into the bottom of the conveyer-trough, from which the beans are again carried by the conveyer to the receptacle and the operation repeated as many times as is necessary. When the moving beans have been sufficiently dried or cured, the valve at the bottom of the receptacle may be shifted to direct the beans to the discharge-trough 41 to thence pass to any suitable receptable or point of deposit.

It will be observed that I have provided an exceedingly compact and simple apparatus and one which insures a thorough and rapid drying of the beans, and while I have herein shown and described one particular embodiment of my invention it is of course to be understood that I do not confine myself to all of the precise details of construction herein referred to, as there may be modifications and variations in certain respects without departing from the essential features of the invention or sacrificing any of the advantages thereof.

Having thus described my invention, I claim as new and desire to secure by Letters Patent—

1. The combination of a receiving-hopper, a conveyer, a receptacle arranged adjacent to the conveyer, a heating-conduit beneath said receptacle, means for supplying a current of heated air to the conduit, a chute leading from the conduit to the receiving-hopper, a discharge-trough leading from the receptacle and a valve for directing the material either to the conduit or trough, substantially as set forth.

2. The combination of a receiving-hopper, a conveyer-trough communicating with said hopper, an endless conveyer traveling in said trough, a receptacle arranged adjacent to said trough, a chute leading from the trough to the receptacle, a drying-conduit arranged beneath an opening in the receptacle, means for supplying heated air to the conduit, a discharge-trough leading from the receptacle and a valve for directing the material to either the trough or conduit.

3. The combination with a conveyer and a coffee-receptacle having an opening in the bottom thereof, of a coffee-drying device arranged below the opening of the receptacle, a discharge-trough for the receptacle, and a valve for directing material in the receptacle to the drying device or to the discharge-trough.

4. The combination of a conveyer, a receptacle communicating with the conveyer and designed to receive material therefrom, a partition dividing said receptacle into compartments, a valve for directing material from the conveyer into either of said compartments, a drying device arranged beneath the receptacle and designed to have material pass therethrough from the receptacle, a discharge-trough for the receptacle, and a valve for directing material to either the discharge-trough or to the drying device.

5. The combination of a feed-hopper, a vertical conveyer-trough communicating with said hopper, an endless conveyer moving in said trough, a receptacle, a chute leading from the conveyer-trough and designed to direct material from the conveyer to the receptacle, a valve arranged in said chute, a drying device including a vertical tubular conduit and a heating-pipe passing therethrough arranged beneath the receptacle and designed to receive material therefrom, said tubular conduit having openings in the lower portion thereof, and means for directing material passing through said openings back into the conveyer-trough.

6. The combination with a receptacle having an opening therein, of a partition dividing said receptacle into compartments, a discharge-trough leading from one of said compartments, a drying-conduit arranged beneath the opening in the receptacle, a perforated heating-pipe lying within the conduit and designed to supply heated air thereto, and a valve arranged at the opening of the receptacle and adapted to direct material therefrom either to the discharge-trough or to the drying-conduit.

7. The combination of a receptacle having an opening therein, a discharge-trough for the receptacle, a drying device arranged beneath the same, said drying device including a tubular conduit, a plurality of plates arranged in the interior thereof, and a heating-pipe passing through the conduit, and a valve for directing material from the receptacle either to the discharge-trough or to the drying device.

8. The combination of a receptacle, a conveyer for supplying material thereto, a drier arranged beneath the receptacle and designed to receive material therefrom, said drier comprising a tubular conduit, plates arranged in the interior of the conduit but spaced apart, a heating-pipe passing through the conduit and designed to supply heated air thereto, and a chute arranged at the lower end of the conduit and designed to carry material therefrom and into the conveyer, substantially as set forth.

9. In an apparatus of the class described, the combination of a tubular conduit, a plurality of segmental plates rigidly secured in a spiral pathway to the interior wall of the conduit, a perforated pipe passing through the conduit, and means for supplying heated air to said pipe.

10. In an apparatus of the class described, a tubular conduit designed to have material supplied thereto, said conduit having openings in the lower portion thereof, a plurality of plates spaced apart and arranged in a spiral pathway on the interior wall of the conduit, a perforated heating-pipe passing longitudinally through the conduit, and means for supplying heated air to said pipe for drying material passing through the conduit, and an inclined chute at the lower portion of the conduit, designed to receive material therefrom and direct it to a desired point.

11. The combination of a feed-hopper, a conveyer-trough communicating therewith, a conveyer traveling in said trough, a receptacle arranged adjacent to the conveyer, a chute for directing material from the conveyer to the receptacle, a partition dividing said receptacle into compartments, said receptacle having an opening in the lower portion thereof, a discharge-trough for the receptacle arranged adjacent to the opening, a drying-conduit arranged beneath the opening, a gate-valve for directing material to either the discharge-trough or to the drying-conduit, a perforated heating-pipe passing through said conduit, means for supplying heated air to said pipe to heat material passing through the conduit, said conduit having openings at the lower end thereof, and an inclined chute arranged adjacent to the openings and communicating with the conveyer-trough, designed to receive the material from the conduit and direct the same back into the conveyer-trough, substantially as set forth.

12. A coffee-drier, comprising a feed-hopper, a conveyer-trough communicating with the hopper, a conveyer in the trough, a receptacle into which the conveyer discharges, a vertical conduit below the receptacle and having openings at its lower end and provided with deflectors, a chute at the lower end of the conduit and leading to the feed-hopper, and a heating-pipe extending into the conduit.

13. A coffee-drier, comprising a feed-hopper, a receptacle having an opening in its bottom and provided with a discharge-trough adjacent to the opening thereof, a valve for directing the material to either the opening or trough, a conveyer for conveying the material from the hopper to the receptacle, a vertical conduit below the receptacle and having openings at its lower end, a chute at the lower end of the conduit and leading to the hopper, and a heating-pipe in the conduit.

In testimony whereof I have signed my name to this specification in the presence of two subscribing witnesses.

EUGENIO PENAGOS.

Witnesses:
 JNO. M. RITTER,
 F. W. HANAFORD.